United States Patent
Du et al.

(10) Patent No.: US 7,552,754 B2
(45) Date of Patent: Jun. 30, 2009

(54) PNEUMATIC TIRE

(75) Inventors: Mingliang Du, Copley, OH (US);
Christopher Vincent Neal, Sr., East Sparta, OH (US); Marc Borowczak, North Canton, OH (US); Thomas Sherwood Fleischman, North Canton, OH (US); Zhonghe Bo, Union City, CA (US); Nagendra Prasad Venkata Akshantala, Copley, OH (US); Laurent Licht, Bereldange (LU); Jean-Marie Feller, Messancy (BE); Jean-Bernard Bodeux, Bastogne (BE); Didier Winkin, Bastogne (BE); Felix Maximo Vilchez Macuri, Colmar Berg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 413 days.

(21) Appl. No.: 11/634,468

(22) Filed: Dec. 6, 2006

(65) Prior Publication Data
US 2007/0137756 A1 Jun. 21, 2007

Related U.S. Application Data (60) Provisional application No. 60/752,416, filed on Dec. 21, 2005.

(51) Int. Cl.
*B60C 15/00* (2006.01)
(52) U.S. Cl. .................... 152/552; 152/539; 152/554
(58) Field of Classification Search .............. 152/539, 152/552, 554
See application file for complete search history.

(56) References Cited

U.S. PATENT DOCUMENTS

| 3,612,137 | A | | 10/1971 | Guyot | 152/362 |
|---|---|---|---|---|---|
| 4,705,091 | A | | 11/1987 | Iuchi | 152/541 |
| 5,080,158 | A | | 1/1992 | Kawamura | 152/541 |
| 5,433,257 | A | * | 7/1995 | Yamaguchi et al. | 152/454 |
| 6,260,597 | B1 | | 7/2001 | Miyazono | 152/543 |
| 6,427,743 | B1 | | 8/2002 | Ueyoko et al. | 152/540 |
| 2004/0007305 | A1 | | 1/2004 | Ueyoko | 152/552 |

OTHER PUBLICATIONS

European Search Report, completed Sep. 25, 2008.

* cited by examiner

*Primary Examiner*—Justin Fischer
(74) *Attorney, Agent, or Firm*—Robert N. Lipcsik (57) ABSTRACT

A pneumatic radial tire has at least one carcass reinforcing ply and a pair of opposing bead portions. Each bead portion has a bead core and a bead apex, while the carcass reinforcing ply has a main portion and two turnups, with one turnup extending from each end of the main portion and having a terminal end. In each bead portion, there is a minimum distance $D_{MIN}$ between the carcass main portion and the carcass turnup, as measured perpendicular to the tire equatorial plane EP. The distance $D_{MIN}$ is not less than 50% of the maximum bead core width $W_B$ as measured perpendicular to the equatorial plane EP. In each bead portion, radially outward of the minimum distance $D_{MIN}$, a radially outermost portion of the carcass turnup extends at an angle so the radially outermost portion of the carcass turnup is divergent from the carcass main portion.

2 Claims, 7 Drawing Sheets

PNEUMATIC TIRE

This application claims the benefit of, and incorporates by reference, U.S. Provisional Application No. 60/752,416 filed Dec. 21, 2005.

FIELD OF THE INVENTION

The present invention is directed to a pneumatic tire. More specifically, the present invention is directed to a pneumatic radial tire wherein the bead portion of the tire is designed for improved durability due to the configuration of the turn-up portion of the carcass reinforcing ply.

BACKGROUND OF THE INVENTION

Figure 7:
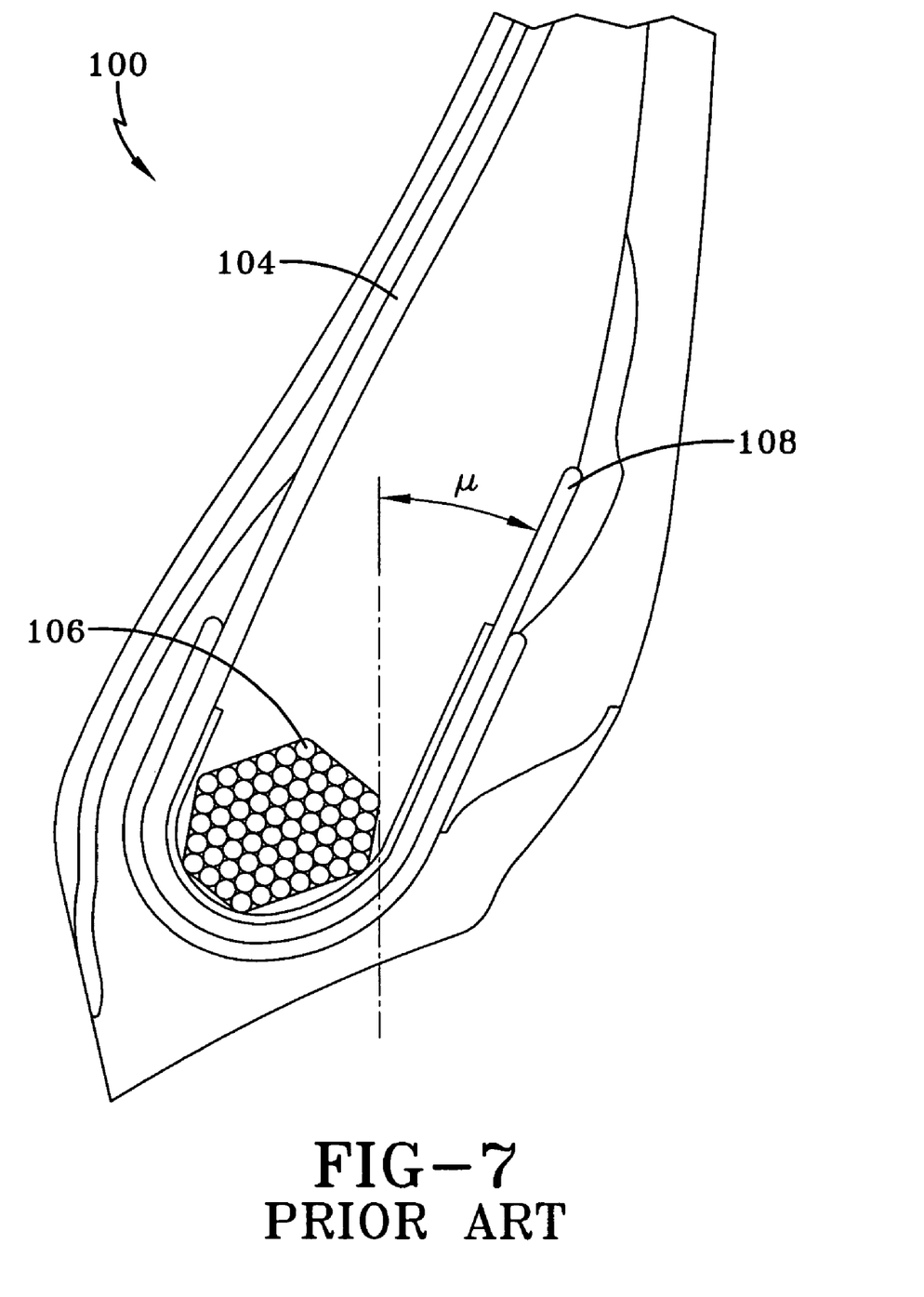
FIG. 7 is a prior art tire bead.

Bead area durability is one of the concerns of the tire industry. A conventional tire bead portion 100 is illustrated in FIG. 7. What is conventionally considered the main portion 104 of a carcass reinforcing ply extends radially inward toward the tire rim and is turned about an inextensible bead core 106 to form a carcass ply turnup 108. The carcass ply turn up 108 extends at a single angle μ relative to a radial line tangent to the axially outermost point of the bead core 106 and parallel to the tire equatorial plane.

Due to the configuration and nature of the radial carcass, when a tire is expanded, the main portion of the carcass is put under tension, pulling the carcass main portion 104 radially upward and the carcass turn up 108 radially inward. After inflation and during operation of the tire, when the tire is under deflection, the carcass ply is subject to bending forces and the carcass main portion 104 moves radially inward while the carcass turn up 108 moves radially and axially outward. During both tension and deflection, the rubber surrounding the carcass main portion 104 and the carcass turn up 108, due to the adhesion relationship between the rubber and the reinforcing cords of the ply, also is forced to move and the rubber is stressed. The movement of the carcass ply and the surrounding rubber may result in cracking of the rubber in the tire bead portion, decreasing durability of the tire.

Other attempts have been made to improve the durability of the bead portion. U.S. Pat. No. 6,260,597 (Miyazono) discloses a pneumatic tire having multiple cord reinforced chafer layers in the bead portions outward of a carcass ply. Axially outward of the carcass ply turnup, the terminal ends of the chafer layers are all at the same height or radially outward of the terminal end of the carcass ply turnup. Because the axially outer chafer plies are predominately radially outward of the carcass ply terminal end, when the bead portion is subjected to strain during operation, it is the chafer ply ends that are subjected to the greater load and where crack initiation may begin, resulting in reduced bead durability. Miyazono teaches that to improve durability, the ends of the chafer plies are bent in various different embodiments while the carcass ply turnup is maintained at a single angle. This solution only works when the chafer plies terminate radially above the carcass ply, and provides no solution for a chafer-less tire or a tire wherein the chafer plies terminate radially inward of the carcass ply turnup.

The solution proposed by Miyazono would not be appreciated by those in the art for such tires as the carcass plies and the cord reinforced chafer plies act differently under tension and deflection. The carcass ply is inclined at a radial angle, extending from bead to bead and so subject to the full tension load and bending forces of the inflated, operating tire while the chafer plies are inclined at bias angles and are only in the bead area and are not subjected to the full tension and deflection of the inflated, operating tire.

SUMMARY OF THE INVENTION

The present invention is directed to a tire having improved bead durability. Disclosed is a pneumatic radial tire having at least one carcass reinforcing ply and a pair of opposing bead portions. Each bead portion has a bead core and a bead apex, while the carcass reinforcing ply has a main portion and two turnups, with one turnup extending from each end of the main portion and having a terminal end. In each bead portion, there is a minimum distance $D_{MIN}$ between the carcass main portion and the carcass turnup, as measured perpendicular to the tire equatorial plane EP. The distance $D_{MIN}$ is not less than 50% of the maximum bead core width $W_B$ as measured perpendicular to the equatorial plane EP. Additionally, in each bead portion, radially outward of the minimum distance $D_{MIN}$, a radially outermost portion of the carcass turnup extends at an angle so the radially outermost portion of the carcass turnup is divergent from the carcass main portion.

In another aspect of the present invention, the divergence of the radially outermost portion of the carcass turnup from the carcass main portion is the difference between the angle σ formed between the radially outermost portion of the carcass turnup, relative to the tire equatorial plane EP, and the angle α formed predominately by the adjacent carcass main portion, relative to the equatorial plane EP. The angle difference (σ–α) is at least 10°, preferably greater than 20°.

In another aspect of the invention, the radially outermost portion of the carcass turnup extends at an angle σ relative to the equatorial plane EP of the tire. The extending angle is in the range of 15° to 75°, preferably 30°-60°.

In another aspect of the invention, the divergent radially outermost portion of the carcass turnup, including the terminal end of the carcass turnup, has a length in the range of 3 to 20 times the average cord diameter of the cords in the carcass ply.

In another aspect of the invention, the divergent radially outermost portion of the carcass turnup forms an obtuse angle with the radially inner portion of the carcass turnup.

In another aspect of the invention, the divergent radially outermost portion of the carcass turnup is curved away from the radially inner portion of the carcass turnup. In this embodiment of the invention, a radius axially outward of the carcass turnup is formed by the carcass turnup.

In another aspect of the invention, the only ply reinforcement layers in the bead portions of the tire are the carcass reinforcing plies. Such a tire does not have any cord reinforced chafer layers located wrapped about the carcass reinforcing ply in the bead portion of the tire. In a different embodiment, if the tire does have a cord reinforced chafer layer in each bead portion, the terminal end of the chafer layer located axially outward of the bead core is radially inward of the terminal end of the at least one carcass reinforcing ply.

In another aspect of the invention, the tire has two carcass reinforcing plies. For such a dual ply tire, with the plies defined relative to one another at the tire equatorial plane, the inner carcass reinforcing ply has a terminal end radially inward of the terminal end of the outer carcass ply. The radially outermost portions of the carcass turnups are both divergent from the main carcass portions of both plies. Alternatively, the inner ply, if not divergent, terminates radially inward of the minimum distance $D_{MIN}$.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employ basically the same components with variations in location or quantity thereby giving rise to the alternative constructions in which the inventive concept can be practiced.

Figure 1:
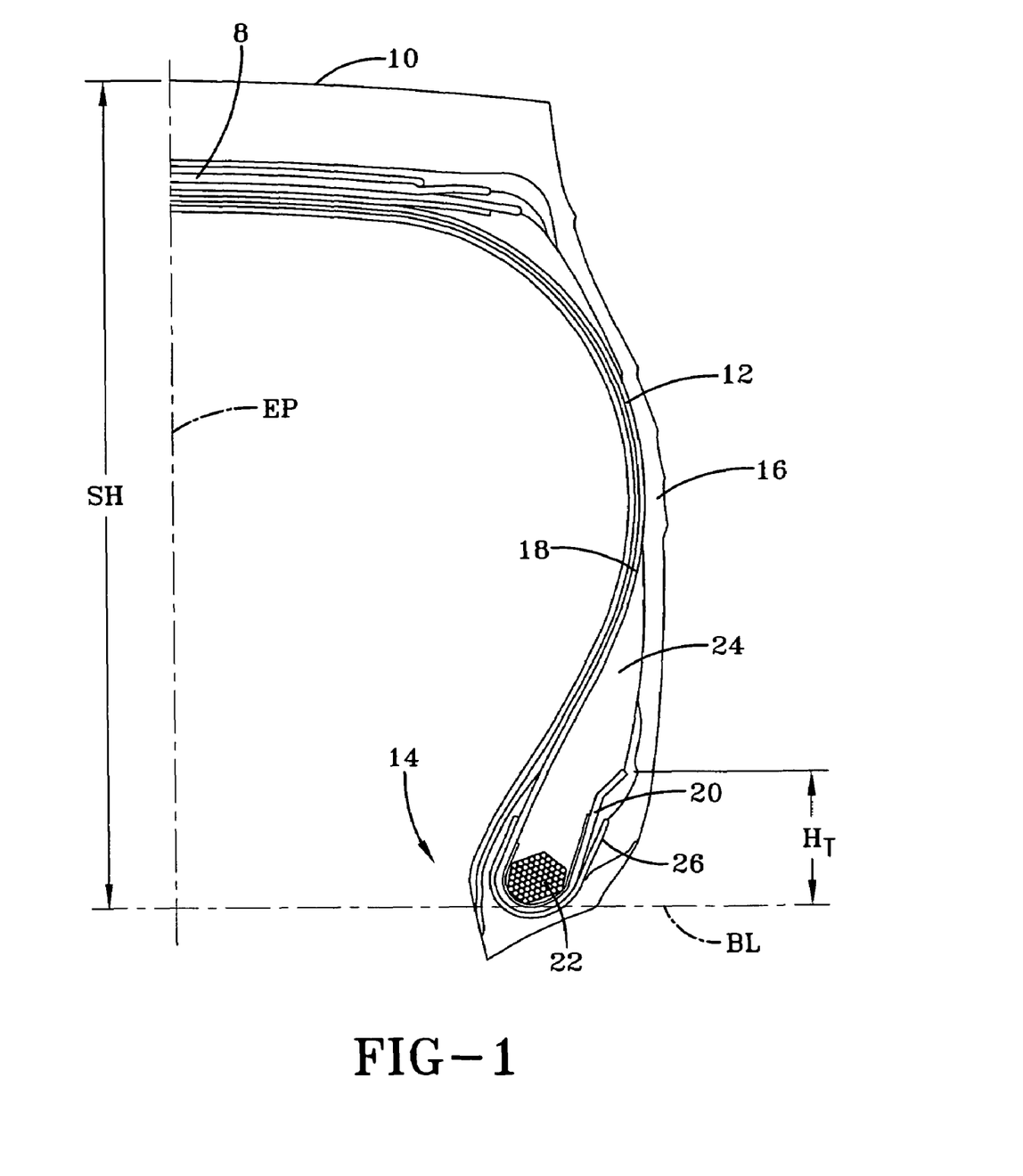
FIG. 1 is a cross-sectional view of half of a pneumatic tire.
Figure 2:
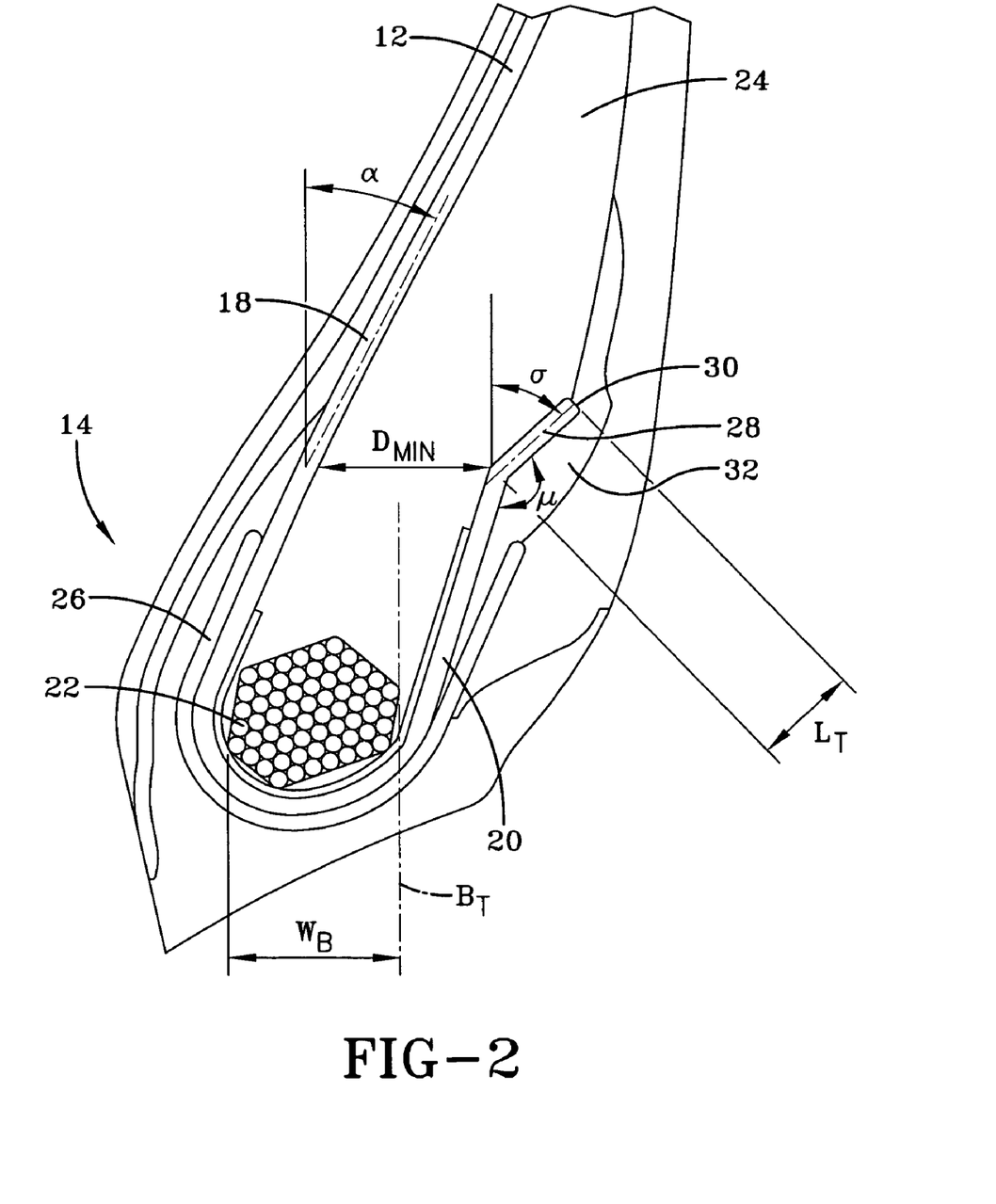
FIG. 2 is a close up of the bead portion of the tire of FIG. 1.

A pneumatic tire in accordance with the present invention is illustrated in FIGS. 1 and 2. The pneumatic tire has a carcass, a belt structure 8 radially outward of the carcass, and a tread 10 radially outward of the belt structure 8. The belt structure 8 may be any of the type conventionally used for a pneumatic tire, and generally will include at least two reinforcement plies of angled, inclined cords and may include a ply of zero degree cords. The actual belt structure of the tire will be dictated by the intended end use of the tire. Similarly, the exact tread configuration will be dictated by the intended end use of the tire.

The carcass has at least one carcass reinforcing ply 12, a pair of opposing bead portions 14 and a pair of opposing sidewalls 16. The ply 12 has a main portion 18 extending through the opposing sidewalls 16 and two carcass turnups 20 initiating in the bead portions 14. Each carcass turnup 20 of the carcass reinforcing ply 12 extends from the main portion 18 of the carcass reinforcing ply 12, and is wrapped about a bead core 22 and a bead apex 24 in the bead portion 14; thus enveloping, at a minimum, the bead core 22 and the lower portion of the bead apex 24 in each bead portion 14. The carcass turnup 20 terminates at a distance $H_T$ from the tire bead base line BL; the distance $H_T$ is at least 20% of the section height SH. The tire bead base line BL is an imaginary line, perpendicular to the equatorial plane EP of the tire, from the intersection of the radially extending outside of the bead portion and the bead base of the tire.

Outward of the carcass ply 12 in the bead portion 14 is a cord reinforced ply, referred to as the chafer 26. The chafer 26 extends from axially inward of the bead core 22 to axially outward of the bead core 22, being turned up around the bead core 22 similar to the carcass ply 12. The axially outer end of the chafer terminates radially inward of the carcass ply 12. The chafer 26 may be omitted from the tire construction so that the only reinforcing cord ply that wraps about the bead core 22 is the carcass ply 12.

To reduce the effect of the shear forces acting on both the carcass main portion 18 and the turnup portion 20, the minimum distance $D_{MIN}$ between the carcass main portion 18 and the carcass turnup 20, as measured perpendicular to the EP, is not less than 50%, preferably not less than 75% of the maximum bead core width $W_B$ as measured perpendicular to the EP. Preferably, to maintain the spacing, the carcass turnup 20 also does not pass axially inward of a radial line BT that is tangent to the axially outermost point of the bead core 22 and parallel to the tire equatorial plane EP.

Figure 3:
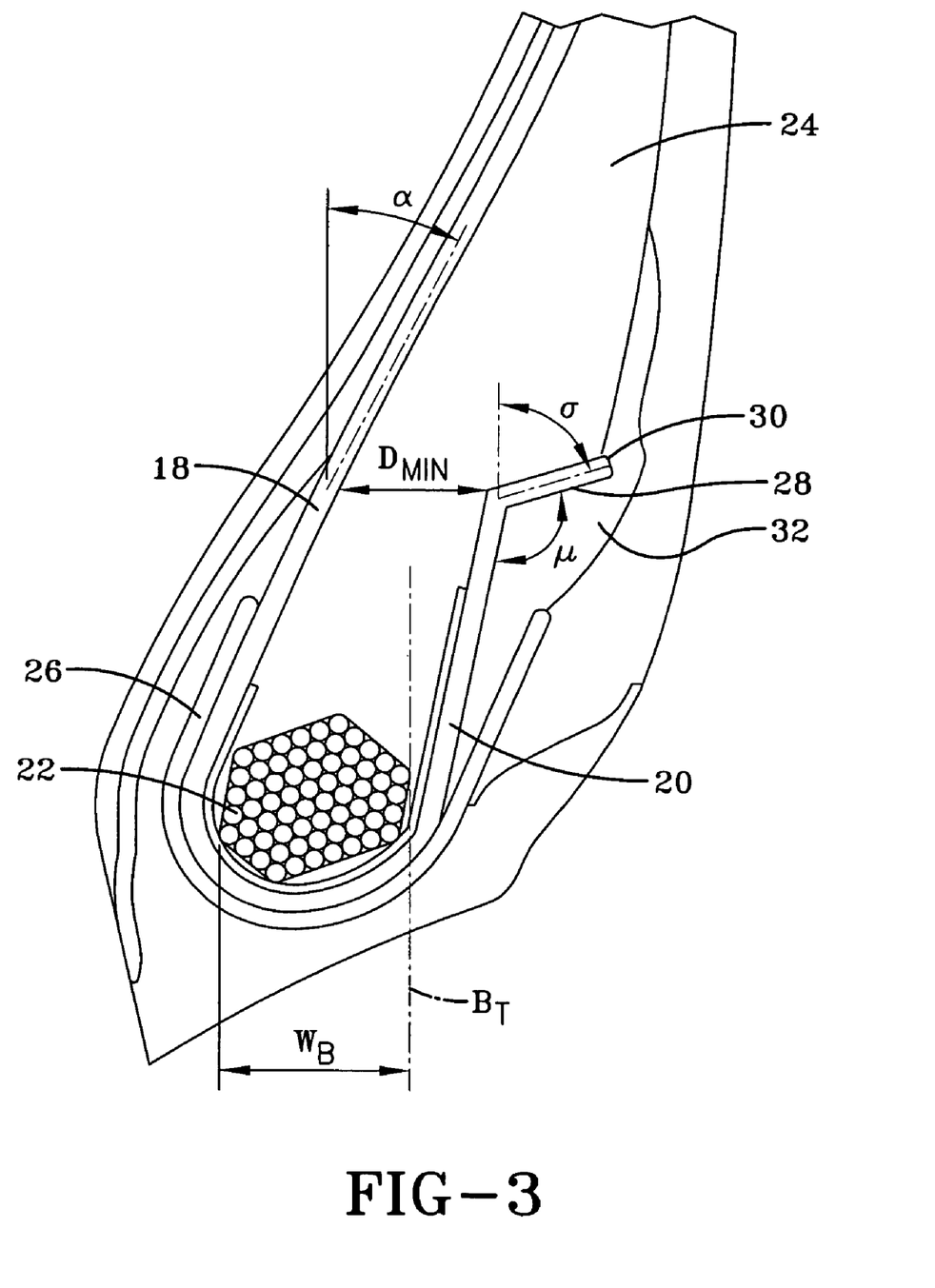
FIGS. 3-5 are alternative bead portion constructions.

In accordance with the invention, radially outward of the minimum distance $D_{MIN}$, a radially outermost portion 28 of the carcass turnup 20, including the carcass ply terminal end 30, extends at an angle so that the portion 28 of the carcass turnup 20 is divergent, or away, from the carcass main portion 18 that is axially adjacent to the carcass turnup 20. The portion 28 extends at an angle σ relative to the equatorial plane EP of the tire, while the adjacent carcass main portion extends at an angle α relative to the equatorial plane EP. The angle σ is in the range of 15° to 75°, preferably 30° to 75°, most preferably 30° to 60°, while the angle difference, σ−α, between the radially outermost portion 28 and the carcass main portion is at least 10°, preferably equal or greater than 20°. In the bead portion of FIG. 2, the radially outermost portion 28 of the carcass turnup 20 is inclined at an angle σ of 45° relative to the tire EP, and has an angle difference, σ−α, of 45°−25°, or 20°. In the bead portion of FIG. 3, the radially outermost portion 28 of the carcass turnup 20 is inclined at an angle σ of 70° relative to the tire EP, and has an angle difference, σ−α, with the carcass main portion 18 of 45°. The radially outermost portion 28 of the carcass turnup 20 forms an obtuse angle μ with the remainder of the carcass turnup 20.

Additionally, the radially outermost portion of the carcass turnup has a length $L_T$ in the range of 3 to 20 times the ply cord diameter. The diameter of the reinforcing cord is the diameter of circle formed by outermost surface of the reinforcing cord. If the reinforcing cord is a non-circular monofilament, such as an obround monofilament, for the purpose of this invention, the maximum width of the monofilament is the value to use as the diameter.

Figure 4:
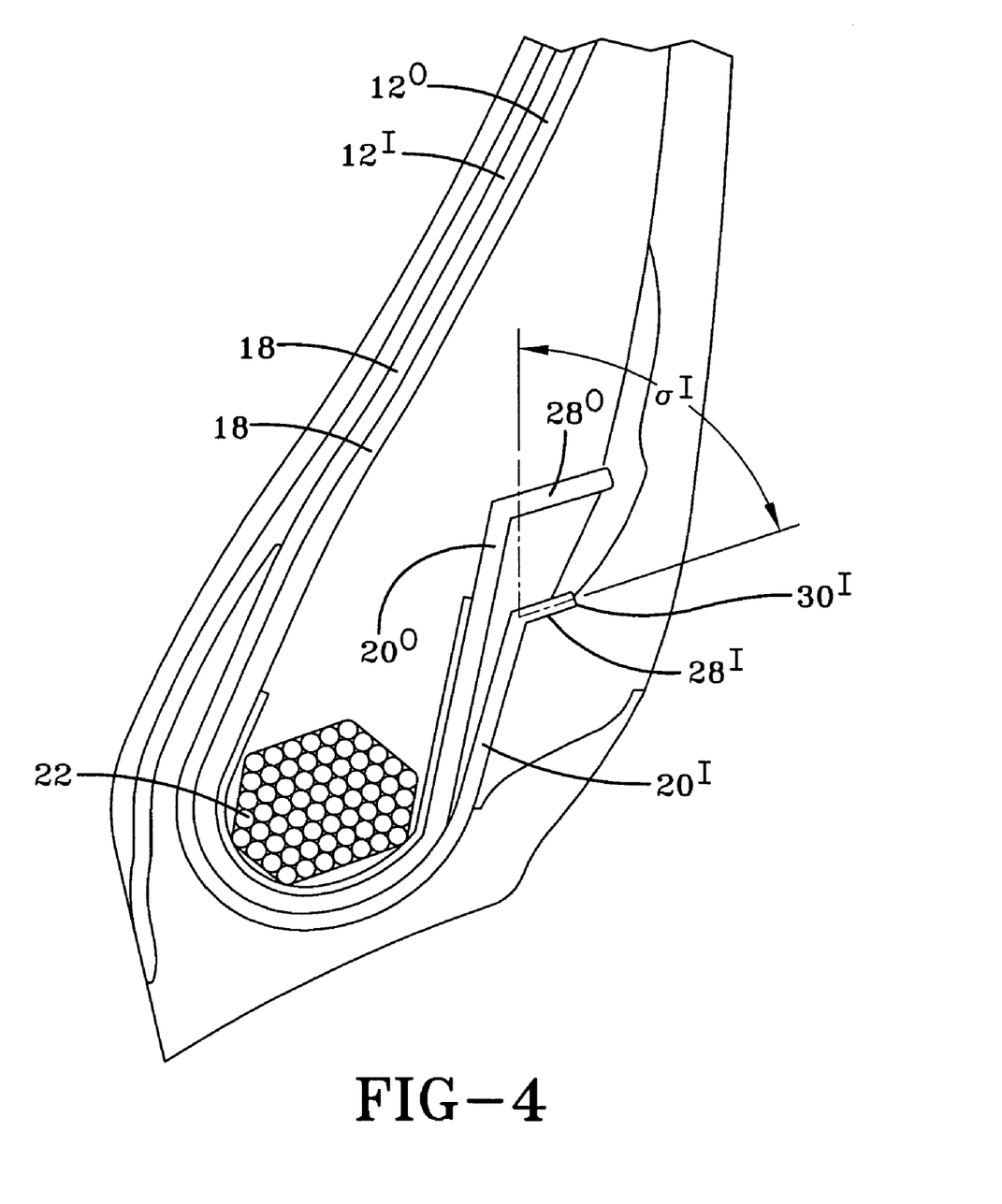

FIG. 4 illustrates a bead portion wherein the tire carcass has two reinforcing plies 12 with divergent terminal ends. Both plies 12 have main portions 18 and turnups 20. The plies 12 are defined as inner and outer relative to their respective positions at the tire equatorial plane EP. The turnup $20^I$ of the inner ply $12^I$ is axially outward of the turnup $20^O$ of the outer ply $12^O$, with the terminal end $30^I$ of the inner ply $12^I$ being radially inward of the terminal end $30^O$ of the outer ply $12^O$. The radially outermost portion $28^I$ of the inner ply $12^I$ has a configuration similar to the first and outer ply $12^O$, with the inclination angle $\sigma^I$ of the radially outermost portion $28^I$, relative to the equatorial plane EP being, at a minimum, identical to that of the outer ply $12^O$. The inclination angle $\sigma^I$ may be 5°-20° greater than the inclination angle $\sigma^O$ of the outer ply radially outermost portion $28^O$.

If the design guideline for a tire requires two plies but only one ply will have the inventive divergent end, to reduce the stress on the plies in the bead region, the terminal end of the inner ply with the non-divergent end, having the radially inner terminal end relative to the terminal end of the outer ply, is located radially inward of the minimum distance $D_{MIN}$. For tires requiring more than two plies, the following design criteria are applied: a) the terminal ends of the plies are staggered, with the outermost ply, defined relative to the respective positions of the plies at the equatorial plane, having a terminal end with the greatest height and b) for terminal ends that are not divergent from the carcass ply main portion, the terminal ends are radially inward of the minimum distance $D_{MIN}$ between the carcass main portions and the carcass turnups.

Figure 5:
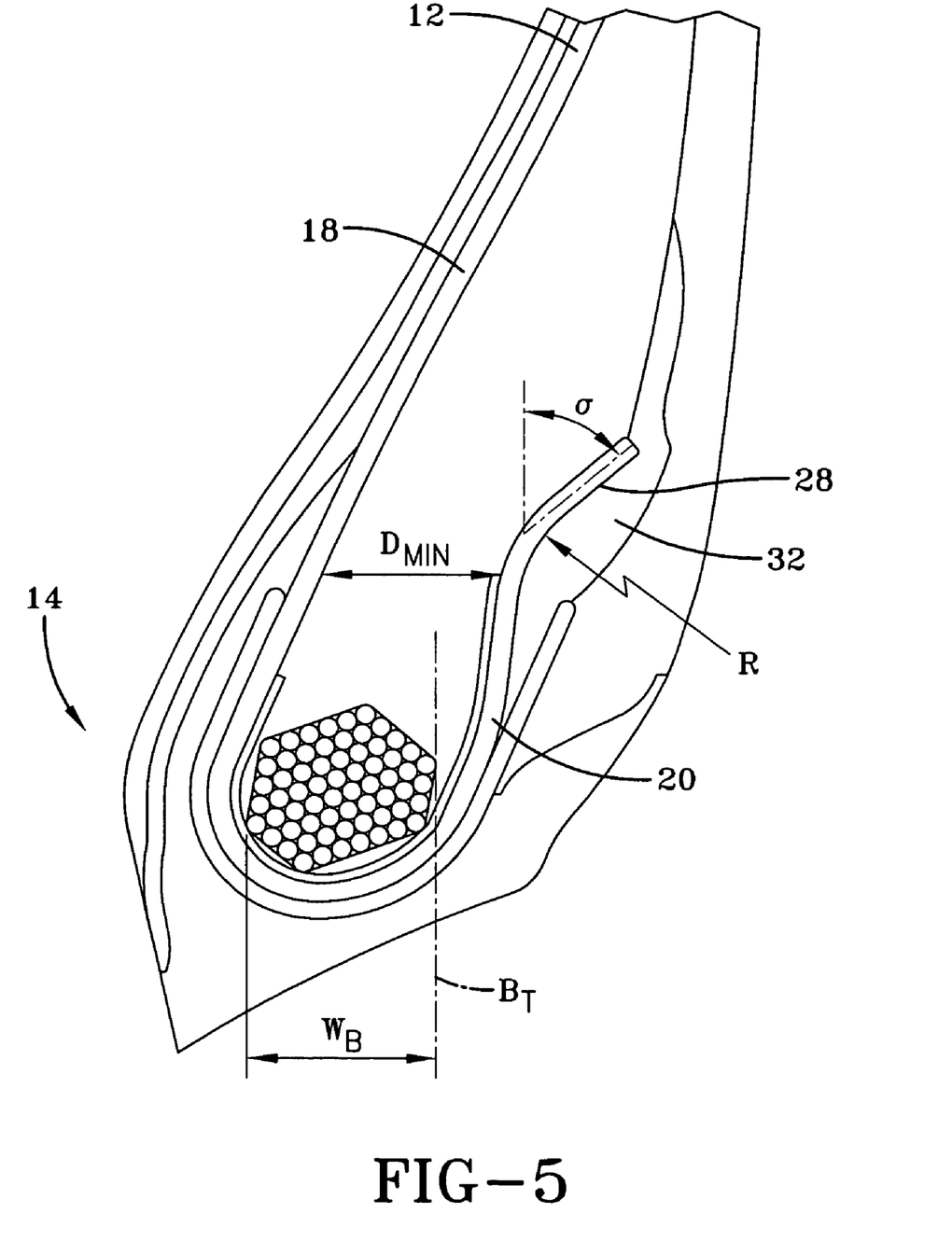

FIG. 5 illustrates another embodiment of the present invention. The radially outermost portion 28 of the carcass turnup 20 extends at an angle so that the portion 28 is divergent from the carcass main portion, however, leading to the divergence, the carcass turnup 20 is gently curved so as to form a radius R axially outward of the carcass turnup 20, as opposed to the obtuse angle μ as seen in the bead portion 14 of FIG. 3. The value of the radius is dependant upon the divergent angle σ formed by the radially outermost portion 28 and the size of the tire. This embodiment may also be used with multiple ply carcass structures, with the additional plies meeting the above design criteria.

In the different embodiments of the present invention, to maintain the configuration of the radially outermost portion 28 of the carcass turnup 20, a rubber layer 32 is located adjacent to the carcass turnup 20. This rubber layer 32 has a hardness comparable to the hardness of the rubber material forming the tire apex 24. If the apex 24 is designed to be formed of multiple rubbers, varying in hardness, the rubber layer 32 has a hardness comparable to the apex rubber closest thereto.

In forming the inventive tire, the carcass plies 12 may be formed from any conventional material, such as, but not limited to, steel, carbon fiber, aramid, nylon, rayon, and polyester. Both the obtuse angle and the radius versions of the bent ply, as discussed above, may be formed from any of the conventional materials, though some materials may be better suited to either the obtuse angle embodiment or the radius embodiment.

Figure 6:
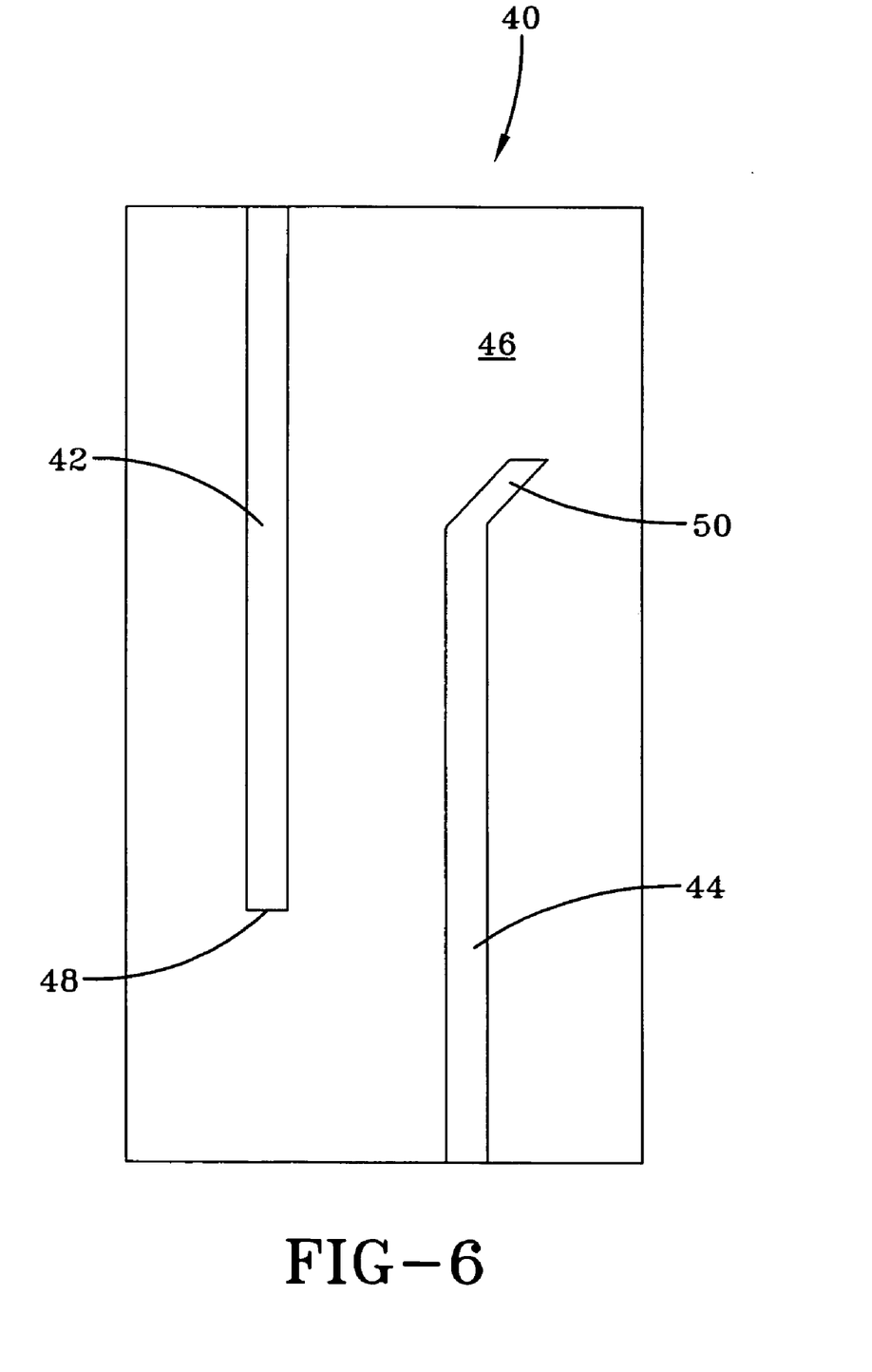
FIG. 6 is illustrative of prepared lab samples.

To determine the effect of the divergent end of the carcass ply, lab samples 40 comprising two plies 42, 44 encased in a rubber rectangle 46 were made having a configuration as shown in FIG. 6. The first ply 42 in the sample 40 extends into the rubber 46 at a single angle, with a terminal end 48. The second ply 44 extends into the rubber 46 and has a bent terminal end 50. The terminal end 48 of the first ply 42 simulates a non-divergent carcass ply terminal end adjacent to a main carcass portion (herein the second ply 44 acts as the main carcass portion) while the bent terminal end 50 of the second ply 44 simulates a divergent carcass ply terminal end adjacent to a main carcass portion (herein the first ply 42 acts as the main carcass portion).

The samples were subjected to cyclic fatigue testing. During testing the samples were checked and measured for the number of cycles to develop a 1 mm crack, i.e. crack initiation, and for the number of cycles to expand to a 2.5 mm crack, i.e. crack growth life. The results are shown below in the table.

|  | Approximate cycles to 1 mm crack | Approximate cycles to 2.5 mm crack |
| --- | --- | --- |
| Straight End | 175,000 | 600,000 |
| Bent End | 1,200,000 | 1,950,000 |

As seen by the above results, the number of cycles until crack initiation for the bent end was about 6.5 times greater than for the straight end. Crack growth life for the bent end was about 3.5 times greater than for the straight end. Samples were also built with a ply end bending inward towards the other ply; the test results for such samples failed to show the substantial improvement afforded by the bent-out configuration. Samples were also tested for total fatigue life under different loads; for testing purposes fatigue life was determined to be equivalent to a thirty percent loss of stiffness in the sample. Under an increased load, the bent end ply showed an improvement six fold over the straight end ply.

The tire of the present invention has an improved life and improved bead durability. The teachings herein are applicable to a broad range of tires and may be useful in tire lines such as, but not limited to, passenger tires, radial medium truck tires, aircraft tires, and off-the-road tires. The teachings may also be useful in improving bead durability for run-flat tires of any type.

What is claimed is:

1. A pneumatic radial tire, the tire comprising at least two carcass reinforcing plies and a pair of opposing bead portions, each bead portion has a bead core and a bead apex, the at least two carcass reinforcing plies each have a main portion and two carcass turnups, each carcass turnup of each ply extending from each end of each carcass main portion and having a terminal end, each carcass main portion extending between the opposing bead cores, each of the four carcass turnups being located axially outward of the bead cores and portions of the bead apexes, wherein in each bead portion, there is a first minimum distance $D_{MIN}$ between a first carcass main portion and a corresponding first carcass turnup, as measured perpendicular to the tire equatorial plane EP, the first distance $D_{MIN}$ being not less than 50% of a maximum bead core width $W_B$ as measured perpendicular to the equatorial plane EP, wherein in each bead portion, radially outward of the first minimum distance $D_{MIN}$, a radially outermost portion of the first carcass turnup extends at a first angle so the radially outermost portion of the first carcass turnup is divergent from the first carcass main portion, wherein in each bead portion, there is a second minimum distance $D_{MIN}$ between a second carcass main portion and a corresponding second carcass turnup, as measured perpendicular to the tire equatorial plane EP, the second distance $D_{MIN}$ being not less than 50% of the maximum bead core width $W_B$ as measured perpendicular to the tire equatorial plane EP, wherein in each bead portion, radially outward of the second minimum distance $D_{MIN}$, a radially outermost portion of the second carcass turnup extends at a second angle so the radially outermost portion of the second carcass turnup is divergent from the second carcass main portion, the first angle being between 5° and 20° greater than the second angle.

2. The tire of claim 1 wherein the first minimum distance $D_{MIN}$ is not less than 75% of the maximum bead width $W_B$.

* * * * *